United States Patent
Walker (10) Patent No.: US 10,774,750 B2
(45) Date of Patent: Sep. 15, 2020

(54) COMPRESSOR WITH STATOR VANE CONFIGURATION IN VICINITY OF BLEED STRUCTURE, AND GAS TURBINE ENGINE

(71) Applicant: MITSUBISHI HEAVY INDUSTRIES, LTD., Tokyo (JP)

(72) Inventor: Thomas Walker, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1136 days.

(21) Appl. No.: 14/894,077

(22) PCT Filed: Feb. 7, 2014

(86) PCT No.: PCT/JP2014/052905
§ 371 (c)(1),
(2) Date: Nov. 25, 2015

(87) PCT Pub. No.: WO2015/056455
PCT Pub. Date: Apr. 23, 2015

(65) Prior Publication Data
US 2016/0123236 A1    May 5, 2016

(30) Foreign Application Priority Data

Oct. 17, 2013   (JP) .................................. 2013-216696

(51) Int. Cl.
*F04D 29/66*   (2006.01)
*F04D 29/54*   (2006.01)
(Continued)

(52) U.S. Cl.
CPC .................. *F02C 9/18* (2013.01); *F01D 5/02* (2013.01); *F01D 9/06* (2013.01); *F01D 17/105* (2013.01);
(Continued)

(58) Field of Classification Search
CPC ...... F02C 3/06; F02C 6/08; F02C 9/18; F01D 5/02; F01D 9/06; F01D 9/041;
(Continued)

(56) References Cited

U.S. PATENT DOCUMENTS

| 5,209,633 A | 5/1993 | McGreehan et al. |
| 2011/0123342 A1* | 5/2011 | Topol ........................ F01D 5/16 |
| | | 416/223 R |
| 2012/0099996 A1 | 4/2012 | Delvaux |

FOREIGN PATENT DOCUMENTS

| CN | 102187061 | 9/2011 |
| CN | 102207093 | 10/2011 |

(Continued)

OTHER PUBLICATIONS

Machine Translation of JP 2011-236801 A, provided by J-PlatPat on Oct. 17, 2018 at https://www4.j-platpat.inpit.go.jp/eng/.*

(Continued)

*Primary Examiner* — Jason H Duger
(74) *Attorney, Agent, or Firm* — Wenderoth, Lind & Ponack, L.L.P.

(57) ABSTRACT

A compressor includes: a plurality of vanes at a vane stage provided to a rotor casing demarcating the primary duct; an air bleed chamber casing that demarcates an air bleed chamber interconnecting with the primary duct; and an air bleed tubing connected to the air bleed chamber casing. Of the plurality of vanes, when a plurality of vanes positioned at a region including the position in the peripheral direction corresponding to the air bleed tubing are a first vane group and a plurality of vanes other than the first vane group are a second vane group, the spacing between the ends at the outside in the radial direction of the vanes that are adjacent in the first vane group is closer than the spacing between the (Continued)

ends at the outside in the radial direction of the vanes that are adjacent in the second vane group.

6 Claims, 6 Drawing Sheets

(51) Int. Cl.
*F01D 5/02* (2006.01)
*F01D 9/06* (2006.01)
*F01D 17/10* (2006.01)
*F01D 25/24* (2006.01)
*F02C 9/18* (2006.01)
*F02C 6/08* (2006.01)
*F02C 3/06* (2006.01)
*F01D 9/04* (2006.01)

(52) U.S. Cl.
CPC ............... *F01D 25/24* (2013.01); *F02C 3/06* (2013.01); *F02C 6/08* (2013.01); *F04D 29/544* (2013.01); *F04D 29/666* (2013.01); *F01D 9/041* (2013.01); *F05D 2220/32* (2013.01); *F05D 2240/12* (2013.01); *F05D 2240/24* (2013.01); *F05D 2260/606* (2013.01); *F05D 2260/961* (2013.01)

(58) Field of Classification Search
CPC ...... F01D 17/105; F01D 25/24; F04D 29/544; F04D 29/666; F05D 2220/32; F05D 2240/12; F05D 2240/24; F05D 2260/606; F05D 2260/961

See application file for complete search history.

(56) References Cited

FOREIGN PATENT DOCUMENTS

| | | | |
|---|---|---|---|
| CN | 102454422 | 5/2012 | |
| GB | 1306891 A | * 2/1973 | ............ F01D 5/141 |
| JP | 49-24005 | 6/1974 | |
| JP | 4-284136 | 10/1992 | |
| JP | 2513954 | 7/1996 | |
| JP | 2003-201998 | 7/2003 | |
| JP | 2011-236801 | 11/2011 | |
| JP | 2012-087788 | 5/2012 | |
| JP | 2013-177816 | 9/2013 | |
| WO | 2008/075747 | 6/2008 | |

OTHER PUBLICATIONS

International Search Report dated May 13, 2014 in corresponding International Application No. PCT/JP2014/052905.
Written Opinion of the International Searching Authority dated May 13, 2014 in corresponding International Application No. PCT/JP2014/052905.
Office Action dated Sep. 5, 2016 in corresponding Chinese Patent Application No. 201480029733.6, with English translation of Search Report.

* cited by examiner

COMPRESSOR WITH STATOR VANE CONFIGURATION IN VICINITY OF BLEED STRUCTURE, AND GAS TURBINE ENGINE

TECHNICAL FIELD

The present invention relates to a compressor which includes a rotor that rotates around an axis and a casing that surrounds the rotor, and a gas turbine which includes the compressor.

Priority is claimed on Japanese Patent Application No. 2013-216696, filed on Oct. 17, 2013, the content of which is incorporated herein by reference.

BACKGROUND ART

A compressor which is provided in a gas turbine or the like, includes a rotor that rotates around an axis and a casing that surrounds the rotor from the outer peripheral side, and compresses a fluid such as air is known. There is a type of compressor that employs a bleed structure for guiding a portion of a compressed fluid to the outside of the compressor.

PTL 1 discloses a compressor which employs a bleed structure in which a bleed slot that extends in a circumferential direction to reduce energy loss during bleeding by a diffuser effect is provided on the outer band of a casing.

CITATION LIST

Patent Literature

[PTL 1] Japanese Unexamined Patent Application Publication No. 4-284136

SUMMARY OF INVENTION

Technical Problem

In general, in the bleed structure, a bleed pipe which guides a bleed fluid toward the outside of the compressor via a bleed chamber from the bleed slot is provided. Furthermore, the bleed fluid has a swirling component in the circumferential direction due to the rotation of the rotor. According to such factors, the flow rate of the fluid is increased in a region including a circumferential position at which the bleed pipe is provided, which is upstream of the bleed slot. Accordingly, it is checked by analysis using computational fluid dynamics (CFD) that the irregularity of a flow rate distribution in a main flow path in the circumferential direction is increased.

Due to the irregular flow rate distribution, pulsation occurs, and a stall occurs in the vicinity of the tip of a rotor blade disposed downstream of the bleed slot. Therefore, there is a possibility that surging may occur in the entire flow of the compressed air. There is a possibility that the operation efficiency of the compressor may be reduced due to such a stall and surging. Particularly, in a case where the number of bleed pipes is reduced for the purpose of a reduction in weight or the like, the irregularity of the flow rate increases, resulting in a reduction in a surge margin. Accordingly, the possibility of the occurrence of surging increases, and this may cause a reduction in the operation efficiency of the compressor.

The present invention provides a compressor capable of suppressing a reduction in operation efficiency by achieving the regularity of the flow rate of a fluid in a main flow path in the vicinity of a slot through which the fluid is bled from the main flow path, and a gas turbine including the same.

Solution to Problem

According to a first aspect of the present invention, a compressor includes: a rotor which rotates around an axis; a rotor casing which surrounds the rotor from an outer peripheral side thereof to allow a main flow path of a fluid to be defined between the rotor casing and the rotor; a plurality of stator blades which are provided with intervals therebetween in a circumferential direction so as to be directed toward an inside in a radial direction from the rotor casing; a bleed chamber casing which is provided on the outer peripheral side of the rotor casing and defines a bleed chamber that communicates with the main flow path via a slot that is formed to extend in the circumferential direction on a downstream side of the stator blade; and a pipe which is connected to the bleed chamber casing from an outer peripheral side thereof and has a bleed flow path formed therein, the bleed flow path guiding the fluid in the bleed chamber to an outside. Among the plurality of stator blades, when a plurality of stator blades positioned in a region including a circumferential position corresponding to the pipe are defined as a first stator blade group and a plurality of stator blades excluding the first stator blade group are defined as a second stator blade group, an interval between end portions of the adjacent stator blades in the first stator blade group on an outside in the radial direction is smaller than an interval between end portions of the adjacent stator blades in the second stator blade group on the outside in the radial direction.

According to the compressor, since the first stator blade group is positioned in the vicinity of the circumferential position at which the pipe is provided, the interval between the end portions of the stator blades on the outside in the radial direction at this position is reduced. Therefore, the flow of the fluid from the main flow path toward the slot through the first stator blade group is impeded at this position, and thus the flow rate of the fluid can be reduced. Accordingly, an increase in the flow rate of the fluid, which is caused by the rotation of the rotor, in the main flow path at the circumferential position at which the pipe is provided in the vicinity of the slot can be suppressed, and thus it becomes possible to achieve the regularity of the distribution of the flow rate of the fluid in the circumferential direction.

According to a second aspect of the present invention, regarding the plurality of stator blades, among the plurality of stator blades, a plurality of stator blades, which are positioned in the region including the circumferential position corresponding to the pipe and are positioned in a region including a circumferential position closer to a first side in a rotation direction of the rotor than the pipe, may function as the first stator blade group.

At the circumferential position at which the pipe is provided on the first side in the rotation direction of the rotor, the flow rate of the fluid which tries to flow into the pipe from the slot via the bleed chamber is increased due to an effect of the rotation of the rotor. Therefore, since the first stator blade group is provided on the first side in the rotation direction of the rotor, it becomes possible to more effectively achieve the regularity of the distribution of the flow rate of the fluid in the circumferential direction in the vicinity of the slot.

According to a third aspect of the present invention, in the plurality of stator blades, the first stator blade group may have a larger number of stator blades provided in a predetermined circumferential region than that of the second stator blade group such that the interval between the end portions of the stator blades therein is small on the outside in the radial direction.

Since the first stator blade group has a larger number of stator blades than that of the second stator blade group, the interval between the end portions of the stator blades on the outside in the radial direction can be easily reduced. Therefore, the flow of the fluid from the main flow path toward the slot through the first stator blade group is impeded, and thus it becomes possible to achieve the regularity of the distribution of the flow rate of the fluid in the circumferential direction in the main flow path in the vicinity of the slot.

According to a fourth aspect of the present invention, in the plurality of stator blades, at least two stator blades which are adjacent to each other in the circumferential direction in the first stator blade group may be provided to become close to each other when moving toward the outside in the radial direction such that the interval between the end portions of the stator blades therein is small on the outside in the radial direction.

Since the stator blades of the first stator blade group are inclined as described above, the interval between the end portions of the stator blades on the outside in the radial direction can be reduced without changing the number of stator blades. Therefore, while suppressing costs by facilitating a manufacturing process, the flow of the fluid from the main flow path toward the slot through the first stator blade group can be impeded, and the regularity of the distribution of the flow rate of the fluid in the circumferential direction in the main flow path in the vicinity of the slot can be achieved.

In addition, since the number of stator blades is not changed, the pressure loss of the fluid that flows through the stator blades is not increased. Therefore, it becomes possible to achieve the regularity of the distribution of the flow rate of the fluid in the circumferential direction while minimizing the profile loss of the stator blades.

According to a fifth aspect of the present invention, a gas turbine includes: the compressor described above, which compresses air as the fluid by rotating the rotor; a combustor which generates combustion gas by combusting a fuel in compressed air that is compressed by the compressor; and a turbine which is driven by the combustion gas from the combustor.

According to the gas turbine, since the compressor described above is included, an increase in the flow rate of the fluid, which is caused by the rotation of the rotor, in the main flow path at the circumferential position at which the pipe is provided in the vicinity of the slot can be suppressed, and thus it becomes possible to achieve the regularity of the distribution of the flow rate of the fluid in the circumferential direction.

Advantageous Effects of Invention

According to the compressor and the gas turbine, by providing the first stator blade group in the stator blades, the regularity of the flow rate of the fluid in the main flow path in the vicinity of the slot through which the fluid is bled from the main flow path is achieved. Accordingly, it becomes possible to suppress a reduction in operation efficiency.

BRIEF DESCRIPTION OF DRAWINGS

FIG. 5 is a view of a main flow path and a slot of a compressor in a case where the solidity of stator blades is constant, when viewed from an outside in a radial direction, and illustrates a view taken along arrow at the same position as that of the view take along arrow III of FIG. 2. In addition, FIG. 5 illustrates the analysis result of the distribution of the flow rate of the air in the main flow path in the vicinity of the slot using the shade of color.

DESCRIPTION OF EMBODIMENTS

First Embodiment

Hereinafter, an axial flow type compressor 1 according to an embodiment of the present invention will be described.

First, a gas turbine 200 which includes the compressor 1 will be described.

Figure 1:
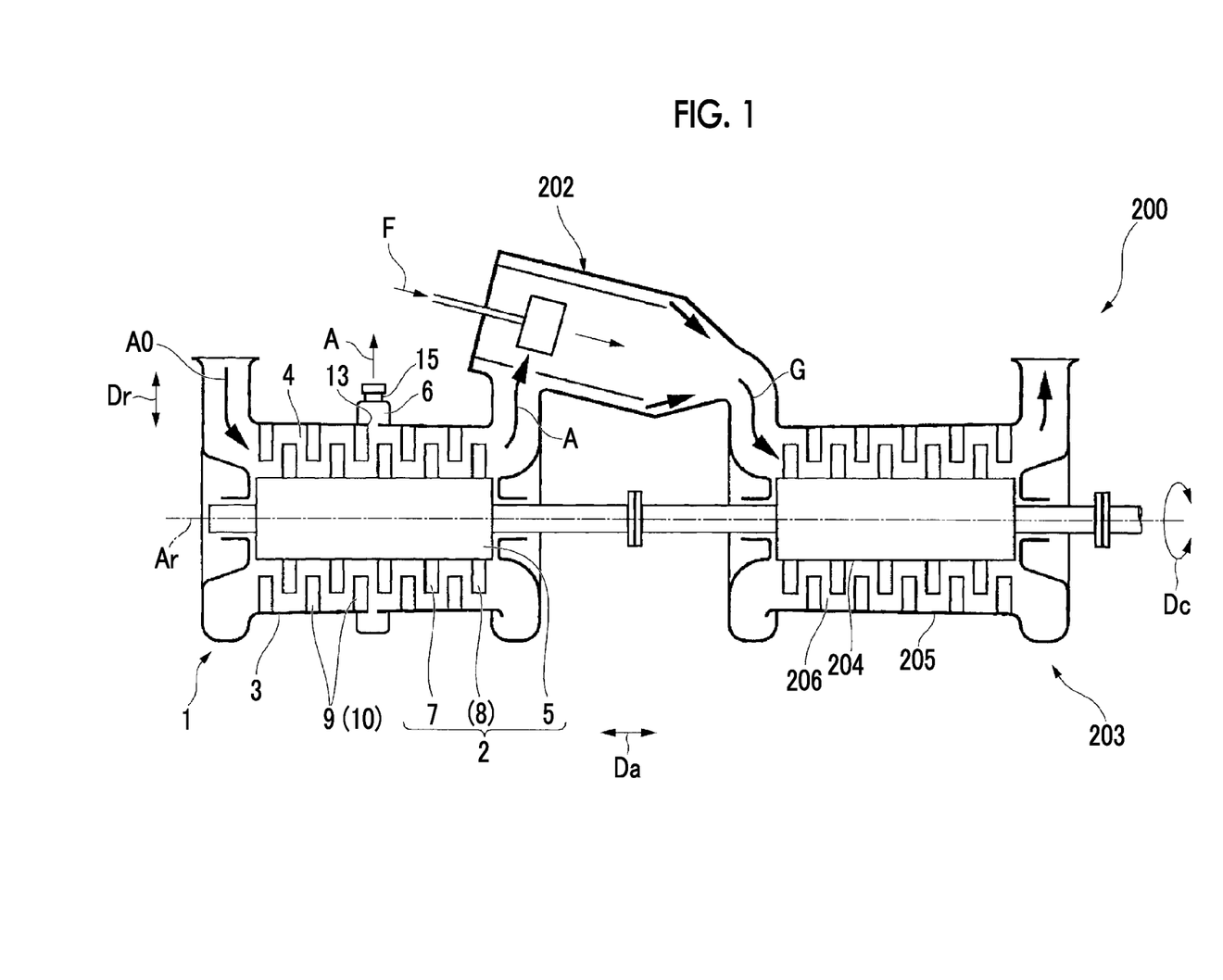
FIG. 1 is a schematic side view of a gas turbine which includes a compressor according to a first embodiment of the present invention.

As illustrated in FIG. 1, the gas turbine 200 includes the compressor 1 which generates compressed air A by compressing outside air A0, a plurality of combustors 202 which generate combustion gas G by mixing a fuel F supplied from a fuel supply source with the compressed air A and combusting the mixture, and a turbine 203 which is driven by the combustion gas G. Hereinafter, the compressed air A is referred to as air A.

The turbine 203 includes a turbine rotor 204 which rotates around a rotational axis Ar, a cylindrical casing 205 which covers the turbine rotor 204. A main flow path 206 is defined between the turbine rotor 204 and the turbine casing 205.

The turbine rotor 204 is connected to a rotor 2 in the compressor 1, which will be described later, and rotates around the rotational axis Ar together with the rotor 2.

Hereinafter, a direction in which the rotational axis Ar extends is referred to as an axial direction Da. A radial direction with respect to the rotational axis Ar is referred to as a radial direction Dr. A side which becomes distant from the rotational axis Ar in the radial direction Dr is referred to as an outside in the radial direction Dr. A side which becomes close to the rotational axis Ar in the radial direction Dr is referred to as an inside in the radial direction Dr. A circumferential direction with respect to the rotational axis Ar is referred to as a circumferential direction Dc.

Figure 3:
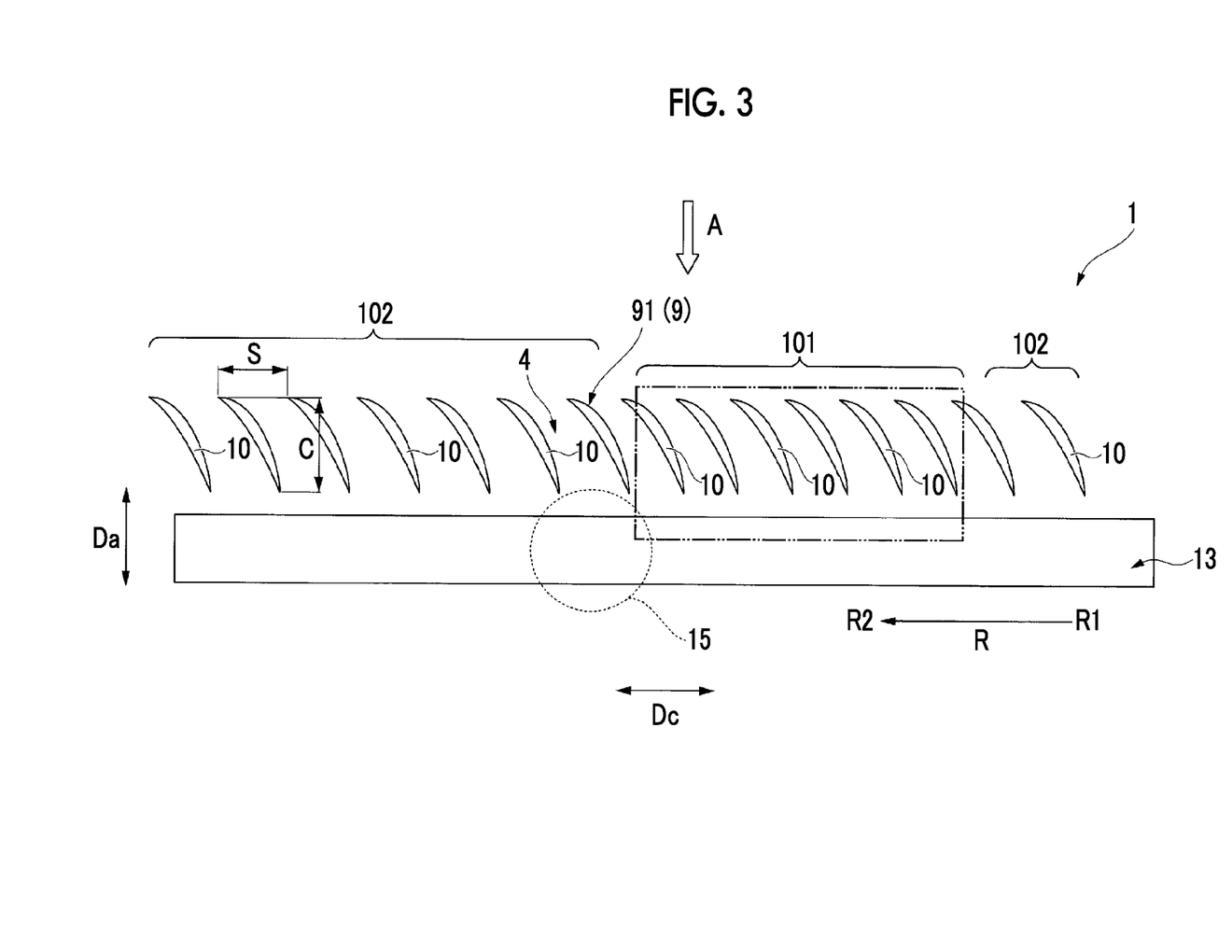
FIG. 3 is a view of a main flow path and a slot of the compressor according to the first embodiment of the present invention, when viewed from an outside in a radial direction, and illustrates a view taken along arrow III of FIG. 2.

In addition, in this embodiment, a direction in which the rotor 2 rotates is referred to as a rotation direction R. As illustrated in FIG. 3, regarding the rotation direction R, a front side in the rotation direction is referred to as a first side R1, and a rear side in the rotation direction is referred to as a second side R2.

The plurality of combustors 202 are fixed to the turbine casing 205 with equal intervals therebetween in the circumferential direction Dc around the rotational axis Ar.

Next, the compressor 1 will be described.

Figure 2:
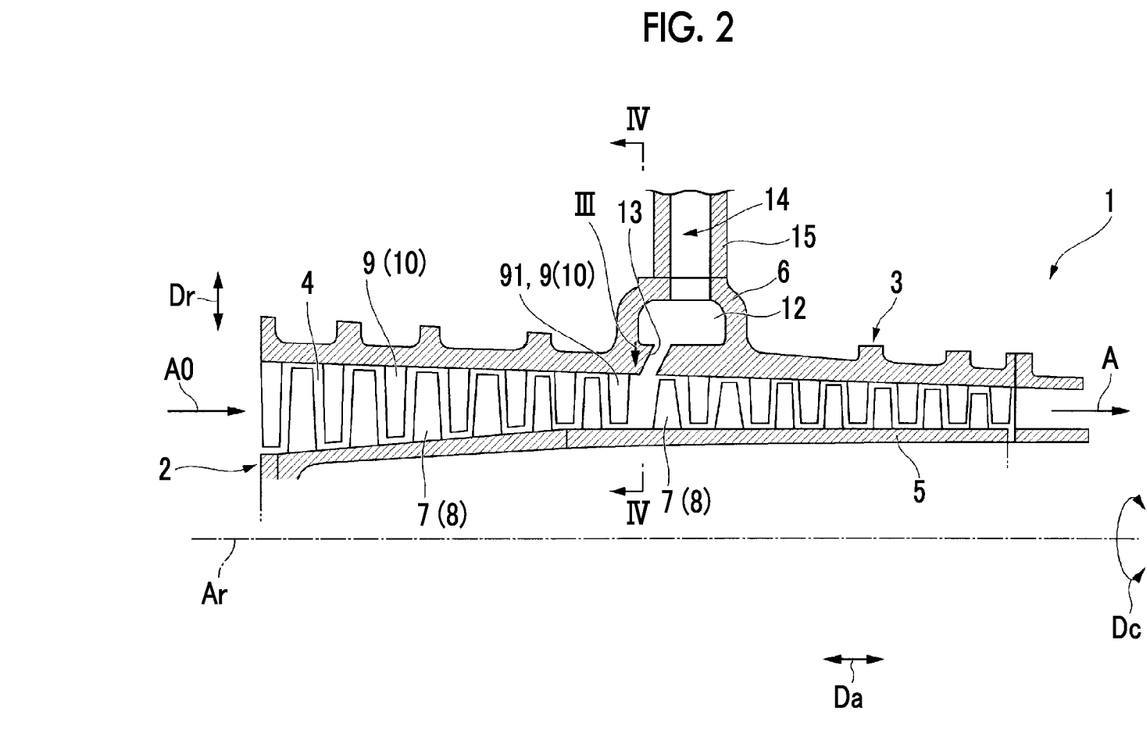
FIG. 2 is a sectional view of the main parts of the compressor according to the first embodiment of the present invention.

As illustrated in FIG. 2, the compressor 1 includes the rotor 2 which rotates around the rotational axis Ar, and a cylindrical rotor casing 3 which covers the rotor 2.

Between the rotor casing 3 and the rotor 2, the annular main flow path 4 through which the compressed air A flows is defined. In addition, the rotor casing 3 includes a plurality of stator blade stages 9 which are provided on the inner peripheral surface thereof with intervals therebetween in the axial direction Da.

Each of the stator blade stages 9 includes a plurality of stator blades 10. The plurality of stator blades 10 are arranged in an annular shape with intervals therebetween in the circumferential direction Dc around the rotational axis Ar and constitute a single stator blade stage 9. Each of the stator blades 10 extends from the inner peripheral surface of the rotor casing 3 toward the inside in the radial direction Dr.

The rotor 2 includes a rotor body 5 which extends in the axial direction Da, and a plurality of rotor blade stages 7 which are fixed to the outer periphery of the rotor body 5 and are provided with intervals therebetween in the axial direction Da.

The rotor body 5 is a shaft-like member having the rotational axis Ar as its central axis, and extends in the axial direction Da.

Each of the rotor blade stages 7 includes a plurality of rotor blades 8. The plurality of rotor blades 8 are arranged in an annular shape with intervals therebetween in the circumferential direction Dc around the rotational axis Ar and constitute a single rotor blade stage 7. Each of the rotor blades 8 extends from the outer periphery of the rotor body 5 toward the outside in the radial direction Dr. A single rotor blade stage 7 is disposed downstream of a single stator blade stage 9, and the rotor blade stage 7 and the stator blade stage 9 are alternately arranged.

As described above, in this embodiment, the compressor 1 is a multi-stage type axial flow compressor which receives the outside air A0 through the main flow path 4 and generates the compressed air A by compressing the outside air A0 in stages through the plurality of stator blade stages 9 and the plurality of rotor blade stages 7.

The compressor 1 further includes a bleed chamber casing 6 provided on the outer peripheral side of the rotor casing 3, and a plurality of bleed pipes 15 connected to the bleed chamber casing 6.

The bleed chamber casing 6 is formed in an annular shape around the rotational axis Ar so as to protrude from the rotor casing 3 toward the outside in the radial direction Dr. A bleed chamber 12 which becomes an annular space between the bleed chamber casing 6 and the rotor casing 3 is defined.

Furthermore, between the stator blade stage 9 and the rotor blade stage 7 which are adjacent to each other in the axial direction Da, a slot 13 which extends in an annular shape in the circumferential direction Dc around the rotational axis Ar and allows the bleed chamber 12 and the main flow path 4 to communicate with each other is formed in the rotor casing 3. More specifically, the slot is inclined toward the upstream side from the downstream side in the axial direction Da when moving from the inside of the bleed chamber 12 in the radial direction Dr toward the main flow path 4.

The bleed pipe 15 is connected to the bleed chamber casing 6 from the outer peripheral side thereof and extends toward the outside in the radial direction Dr. A bleed flow path 14 which communicates with the bleed chamber 12 is formed on the inside of the bleed pipe 15.

In this embodiment, the bleed pipe 15 is connected to the bleed chamber casing 6 with an interval in the circumferential direction Dc. The number of bleed pipes 15 varies depending on the type of the compressor 1.

As described above, the air A is bled from the main flow path 4 through the slot 13, the bleed chamber 12, and the bleed pipe 15. The bleed air A is guided to the outside of the compressor 1.

Here, the stator blade stages 9 will be described in more detail.

Among the stator blade stages 9, the stator blade stage 9 which is provided closest to the slot 13 on the upstream side of the slot 13 is referred to as a stator blade stage 91.

Figure 4:
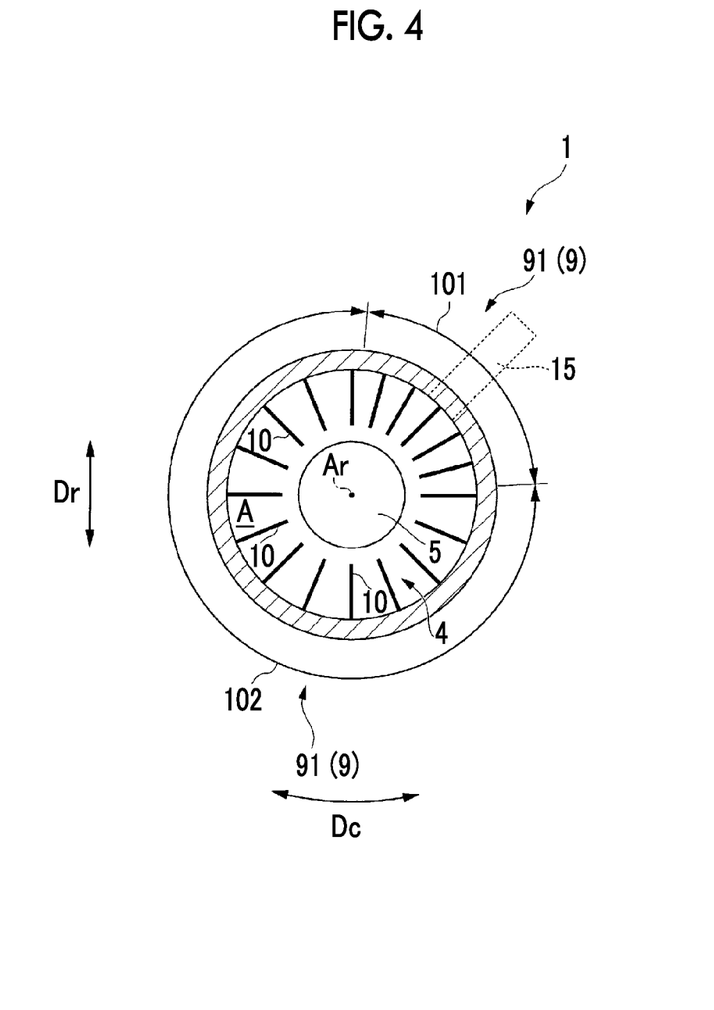
FIG. 4 is a view of the compressor according to the first embodiment of the present invention, when viewed in an axial direction, and illustrates a view taken along line IV-IV of FIG. 2.

As illustrated in FIGS. 3 and 4, among the stator blades 10 constituting the stator blade stage 91, a plurality of stator blades 10 positioned in a region including a circumferential position Dc corresponding to the bleed pipe 15 are referred to as a first stator blade group 101. In addition, a plurality of stator blades 10 excluding the first stator blade group 101 are defined as a second stator blade group 102.

In this embodiment, the first stator blade group 101 is positioned in a region including the position of the rotor body 5 in the circumferential direction Dc closer to the first side R1 in the rotation direction R than a position at which the bleed pipe 15 is provided in the circumferential direction Dc.

The interval between the end portions of the adjacent stator blades 10 in the first stator blade group 101 on the outside in the radial direction Dr is smaller than the interval between the end portions of the adjacent stator blades 10 in the second stator blade group 102 on the outside in the radial direction Dr.

More specifically, in this embodiment, the first stator blade group 101 has a larger number of stator blades 10 provided in a predetermined circumferential region than that of the second stator blade group 102. That is, the solidity C/S of the stator blades 10 of the first stator blade group 101 is higher than that of the second stator blade group 102.

The solidity C/S is a value obtained by dividing the dimension of the stator blades 10 in the axial direction Da by the distance in the circumferential direction Dc between the stator blades 10 which are adjacent to each other in the circumferential direction Dc. Here, the solidity C/S in this embodiment represents a value measured at the end portions of the stator blades 10 on the outside in the radial direction Dr.

According to the compressor 1 described above, since the first stator blade group 101 is provided in the stator blade stage 91 on the upstream side of the slot 13, the first stator blade group 101 is positioned in the vicinity of the position at which the bleed pipe 15 is provided in the circumferential direction Dc, and the interval between the end portions of the stator blades 10 on the outside in the radial direction Dr at this position is reduced.

Figure 5:
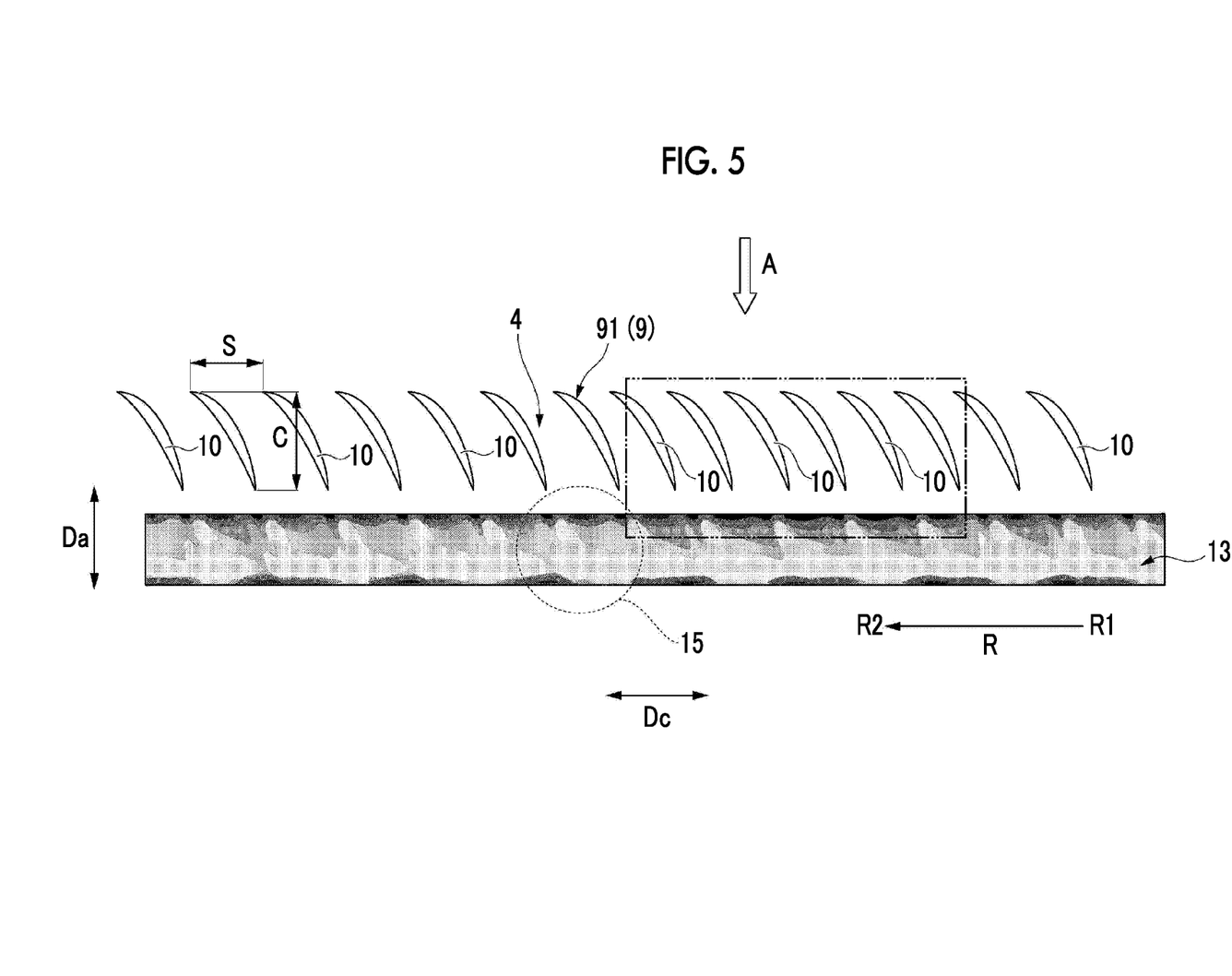

FIG. 5 illustrates a case where the first stator blade group 101 is not provided in the stator blade stage 91 and all of the stator blades 10 have the same solidity C/S as that of the second stator blade group 102, that is, a case where the solidity C/S of the stator blades 10 is constant. In this case, the air A has a swirling component due to the rotation of the rotor 2 and thus the flow rate of the air A has a distribution in the circumferential direction Dc in the main flow path 4 in the vicinity of the slot 13. More specifically, parts having light color illustrated in FIG. 5 are parts having a low flow rate, and parts having dark color are parts having a high flow rate.

Referring to FIG. 5, a phenomenon in which the flow rate of the air A is increased is shown in the vicinity of the position at which the bleed pipe 15 is provided in the circumferential direction Dc. Moreover, on the first side R1 in the rotation direction R of the rotor 2 and on the upstream side in the axial direction Da, the phenomenon in which the flow rate of the air A is increased becomes significant.

In this embodiment, by providing the first stator blade group 101 in a region including the position in the circumferential direction Dc of the rotor 2 closer to the first side R1 in the rotation direction R than the position at which the bleed pipe 15 is provided in the circumferential direction Dc, the flow of the air A from the main flow path 4 into the slot 13 through the first stator blade group 101 can be effectively impeded.

As a result, the flow rate of the air A in the region in which the first stator blade group 101 is provided in the circumferential direction Dc can be reduced. Therefore, it becomes possible to effectively achieve the regularity of the distribution of the flow rate of the air A in the circumferential direction Dc in the main flow path 4 in the vicinity of the slot.

According to the compressor 1 of this embodiment, by providing the first stator blade group 101 in the stator blades 10 which are close to the upstream side of the slot 13, it becomes possible to achieve the regularity of the flow rate of the air A in the vicinity of the slot 13 through which air is bled from the main flow path 4. Accordingly, it becomes possible to increase a surge margin and suppress a reduction in operation efficiency.

Even in a case where the number of bleed pipes 15 needs to be reduced to achieve a reduction in weight, by adjusting the solidity C/S of the stator blade stage 91 as described above, it becomes possible to achieve the regularity of the flow rate of the air A in the main flow path 4 in the vicinity of the slot 13. Accordingly, it becomes possible to suppress a reduction in operation efficiency.

Second Embodiment

Figure 6:
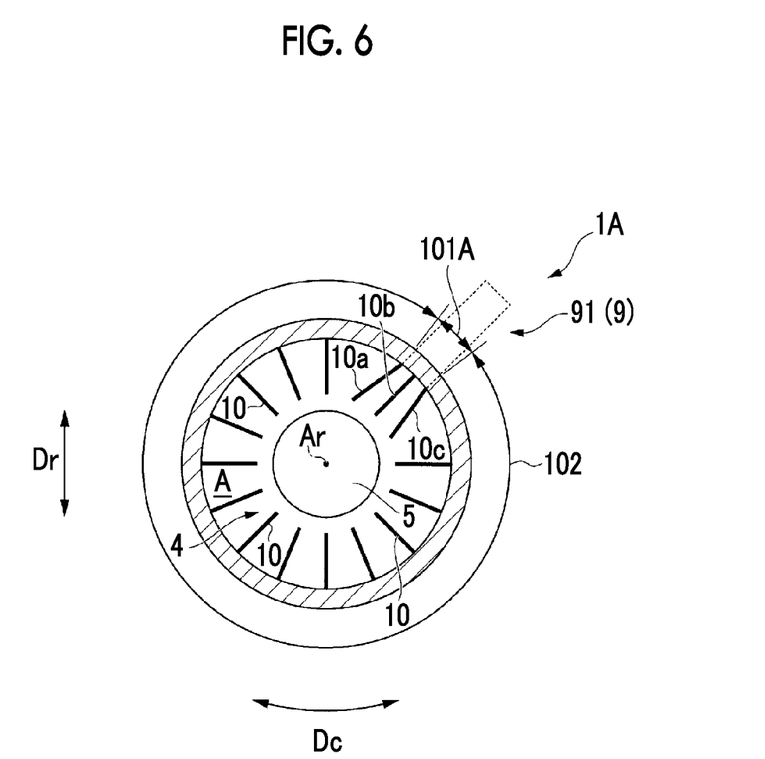
FIG. 6 is a view of a compressor according to a second embodiment of the present invention, when viewed in an axial direction, and illustrates a sectional view viewed at the same position as that of the sectional view taken along line IV-IV of FIG. 2.

Next, a compressor 1A according to a second embodiment of the present invention will be described with reference to FIG. 6.

A first stator blade group 101A in the compressor 1A of this embodiment is different from that of the first embodiment.

In the first stator blade group 101A, the stator blades 10 are inclined in the circumferential direction Dc when moving toward the outside in the radial direction Dr.

More specifically, in this embodiment, among three stator blades 10 provided in the first stator blade group 101A, stator blades 10a and 10c positioned at both ends in the circumferential direction Dc are inclined to become close to a stator blade 10b interposed therebetween. Accordingly, the solidity C/S of the stator blades 10a and 10b and the solidity C/S of the stator blades 10c and 10b are higher than the solidity C/S of the second stator blade group 102.

According to the compressor 1A of this embodiment, since the stator blades 10 in the first stator blade group 101A are inclined, the interval between the end portions of the adjacent stator blades 10 in the first stator blade group 101A on the outside in the radial direction can be reduced without increasing the number of stator blades 10. That is, it becomes possible to reduce the interval between the stator blades 10.

Therefore, while suppressing costs by facilitating a manufacturing process, the flow of the air A from the main flow path 4 toward the slot 13 through the first stator blade group 101A can be impeded, and thus the flow rate of the air A can be further reduced. As a result, it becomes possible to achieve the regularity of the distribution of the flow rate of the air A in the circumferential direction Dc in the main flow path 4 in the vicinity of the slot 13.

In addition, by not changing the number of stator blades 10 in the first stator blade group 101, the pressure loss of the air A that flows through the stator blades 10 is not increased. Therefore, it becomes possible to reduce the flow rate of the air A that flows from the main flow path 4 toward the slot 13 through the first stator blade group 101A while minimizing the profile loss of the stator blades 10.

In this embodiment, the solidity C/S is increased by inclining the two stator blades 10 in the first stator blade group 101A. However, it is possible to increase the solidity C/S by providing at least two stator blades 10 which are adjacent to each other in the circumferential direction Dc to become close to each other when moving toward the outside in the radial direction Dr.

While the details of the embodiments of the present invention have been described, slight changes in design can be made without departing from the technical spirit of the present invention.

For example, the first stator blade group 101 (101A) is provided closer to the first side R1 in the rotation direction R than the bleed pipe 15. However, as shown in the analysis result of FIG. 5, even in the vicinity of a position at which the bleed pipe 15 is provided outside of the first side R1 in the rotation direction R, there is a part in which the flow of the air A increases in the main flow path 4 in the vicinity of the slot 13. Therefore, the first stator blade group 101 (101A) may also be provided in a region including a position corresponding to the part in which the flow rate increases, that is, a region including a position in the circumferential direction Dc corresponding to the position at which the bleed pipe 15 is provided while being on the second side R2 in the rotation direction R.

INDUSTRIAL APPLICABILITY

According to the compressor and the gas turbine, by providing the first stator blade group in the stator blades, the regularity of the flow rate of the fluid in the main flow path in the vicinity of the slot, through air is bled from the main flow path, can be achieved. Accordingly, it becomes possible to suppress a reduction in operation efficiency.

REFERENCE SIGNS LIST 1, 1A compressor
2 rotor
3 rotor casing
4 main flow path
5 rotor body
6 bleed chamber casing
7 rotor blade stage
8 rotor blade
9 stator blade stage
10, 10a, 10b, 10c stator blade
12 bleed chamber
13 slot
14 bleed flow path
15 bleed pipe
91 stator blade stage
101, 101A first stator blade group
102 second stator blade group R rotation direction
R1 first side in rotation direction
R2 second side in rotation direction
Ar rotational axis
Da axial direction
Dr radial direction
Dc circumferential direction
A air (compressed air, fluid)
A0 outside air
200 gas turbine
202 combustor
203 turbine
204 turbine rotor
205 turbine casing
206 main flow path
F fuel
G combustion gas

The invention claimed is:

1. A compressor comprising:
a rotor which is rotatable around an axis;
a rotor casing which surrounds the rotor from an outer peripheral side thereof to allow a main flow path of a fluid to be defined between the rotor casing and the rotor;
a stator blade stage including a circular array of a plurality of stator blades extending radially inward from the rotor casing, the plurality of stator blades being provided with intervals therebetween in a circumferential direction of the rotor casing so as to be directed toward an inside of the rotor casing;
a bleed chamber casing which is provided on an outer peripheral side of the rotor casing, the bleed chamber casing defining a bleed chamber that communicates with the main flow path via a slot that is formed in the rotor casing and extends in the circumferential direction on a downstream side of the stator blade stage, the stator blade stage disposed immediately upstream from the slot; and
a pipe which is connected to the bleed chamber casing from an outer peripheral side thereof and has a bleed flow path formed therein, the bleed flow path being configured to guide the fluid in the bleed chamber to an outside,
wherein a first stator blade group is defined by a first plurality of the stator blades positioned in a region corresponding to a circumferential position that includes the pipe, the first plurality of the stator blades being equally spaced from one another in the circumferential direction,
wherein a second stator blade group is defined by a second plurality of the stator blades that exclude the first stator blade group, the second plurality of the stator blades being equally spaced from one another in the circumferential direction,
wherein each stator blade in the circular array of the plurality of stator blades is included in one of the first plurality of the stator blades and the second plurality of the stator blades,
wherein an interval between outside end portions of adjacent stator blades in the first stator blade group is smaller than an interval between outside end portions of adjacent stator blades in the second stator blade group, and
wherein a circumferential region of the stator blade stage occupied by the first stator bade group is smaller than a circumferential region of the stator blade stage occupied by the second stator blade croup.

2. The compressor according to claim 1, wherein at least two of the stator blades of the first plurality of the stator blades, which are adjacent to each other in the circumferential direction and in the first stator blade group, are provided so as to become further apart from each other in a radially outward direction.

3. The compressor according to claim 1, wherein the stator bade stage is disposed immediately upstream from the slot, and wherein an interval between inside end portions of the adjacent stator blades in the first stator blade group is smaller than an interval between inside end portions of the adjacent stator blades in the second stator blade group.

4. The compressor according to claim 1, wherein at least two stator blades of the first plurality of the stator blades, which are adjacent to each other in the circumferential direction and in the first stator blade group, are provided so as to become closer to each other in a radially outward direction.

5. A gas turbine comprising: the compressor according to claim 1, the compressor compressing air as the fluid by rotating the rotor; a combustor which generates combustion gas by combusting a fuel in the compressed air that is compressed by the compressor; and a turbine which is driven by the combustion gas from the combustor.

6. A compressor comprising:
a rotor which is rotatable around an axis;
a rotor casing which surrounds the rotor from an outer peripheral side thereof to allow a main flow path of a fluid to be defined between the rotor casing and the rotor;
a plurality of stator blade stages extending radially inward from an inner peripheral surface of the rotor casing, wherein a first stator blade stage of the stator blade stages includes a circular array of a plurality of stator blades extending radially inward from the rotor casing, the plurality of stator blades being provided with intervals therebetween in a circumferential direction of the rotor casing so as to be directed toward an inside of the rotor casing;
a bleedchamber casing which is provided on the outer peripheral side of the rotor casing, the bleed chamber casing defining a bleed chamber that communicates with the main flow path via a slot that is formed in the rotor casing and extends in the circumferential direction on a downstream side of the stator blades; and
a pipe which is connected to the bleed chamber casing from an outer peripheral side thereof and has a bleed flow path formed therein, the bleed flow path being configured to guide the fluid in the bleed chamber to an outside,
wherein the first stator blade stage is disposed immediately upstream from the slot,
wherein a first stator blade group is defined by a first plurality of the stator blades positioned in a region corresponding to a circumferential position that includes the pipe, the first plurality of the stator blades being equally spaced from one another in the circumferential direction,
wherein a second stator blade group is defined by a second plurality of the stator blades that exclude the first stator blade group, the second plurality of the stator blades being equally spaced from one another in the circumferential direction,
wherein each stator blade in the circular array of the plurality of stator blades is included in one of the first plurality of the stator blades and the second plurality of the stator blades, wherein an interval between outside end portions of adjacent stator blades in the first stator blade group is smaller than an interval between outside end portions of adjacent stator blades in the second stator blade group, and wherein a circumferential region of the first stator blade stage occupied by the first stator blade group is smaller than a circumferential region of the first stator blade stage occupied by the second stator blade group.

\* \* \* \* \*